US008711201B2

(12) United States Patent
Gorzynski (10) Patent No.: US 8,711,201 B2
(45) Date of Patent: Apr. 29, 2014

(54) CONTROLLING A VIDEO WINDOW POSITION RELATIVE TO A VIDEO CAMERA POSITION

(75) Inventor: Mark E Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 302 days.

(21) Appl. No.: 13/123,191

(22) PCT Filed: Nov. 4, 2008

(86) PCT No.: PCT/US2008/082373
§ 371 (c)(1),
(2), (4) Date: Apr. 7, 2011

(87) PCT Pub. No.: WO2010/053473
PCT Pub. Date: May 14, 2010

(65) Prior Publication Data
US 2011/0193935 A1    Aug. 11, 2011

(51) Int. Cl.
*H04N 7/14* (2006.01)
(52) U.S. Cl.
USPC ............... 348/14.07; 348/14.01; 348/14.08; 348/14.1; 348/14.16
(58) Field of Classification Search
USPC .......... 379/14.01, 14.02, 14.03, 14.04, 14.05, 379/14.06, 14, 7, 14.08, 14.09, 14.1, 14.11, 379/14.12, 14.13, 14.14, 15.15, 14.16; 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| | | | | |
|---|---|---|---|---|
| 5,786,846 A * | 7/1998 | Hiroaki | | 348/14.16 |
| 6,208,373 B1 * | 3/2001 | Fong et al. | | 348/14.16 |
| 6,507,356 B1 * | 1/2003 | Jackel et al. | | 348/14.06 |
| 6,731,334 B1 * | 5/2004 | Maeng et al. | | 348/211.12 |
| 2003/0067535 A1 * | 4/2003 | Creed et al. | | 348/14.04 |
| 2003/0151658 A1 | 8/2003 | Smith | | |
| 2004/0114032 A1 | 6/2004 | Kakii et al. | | |
| 2005/0219356 A1 * | 10/2005 | Smith et al. | | 348/14.05 |
| 2008/0136896 A1 * | 6/2008 | Graham et al. | | 348/14.08 |
| 2008/0158340 A1 | 7/2008 | Shibata et al. | | |
| 2008/0246833 A1 * | 10/2008 | Yasui et al. | | 348/14.08 |

FOREIGN PATENT DOCUMENTS

| | | | |
|---|---|---|---|
| FR | 2761562 A1 | 10/1998 | |
| JP | 9107531 A | 4/1997 | |
| JP | 9107531 A | 4/1997 | |

OTHER PUBLICATIONS

The International Search Report and the Written Opinion of the International Searching Authority for International Application No. PCT/US2008/082373 dated Jul. 23, 2009, pp. 11.
Extended European Search Report, Application No. EP 08878031.7, Date of Mailing: Nov. 21, 2013, pp. 1-6.

* cited by examiner

*Primary Examiner* — Khai N Nguyen (57) ABSTRACT

A position of one or more video cameras is determined. The position of one or more video cameras is communicated with a video communication application. A position of one or more video windows is controlled from the position of one or more video cameras, where controlling the position of one or more video windows further involves one or more video windows being positioned at a position closest to one or more video cameras.

17 Claims, 9 Drawing Sheets

CONTROLLING A VIDEO WINDOW POSITION RELATIVE TO A VIDEO CAMERA POSITION

CROSS-REFERENCE TO RELATED APPLICATION

This application is a national stage application under 35 U.S.C. §371 of PCT/US2008/082373, filed Nov. 4, 2008.

BACKGROUND

The purpose of video communication is often to both see the identity of the speaker and to observe reactions to non-verbal communication. Maintaining eye contact when communicating is a powerful communication tool that allows people to connect with one another. In addition, good eye contact has been shown in the past to be beneficial for quality communication between two people.

As individuals more frequently turn to video conferencing or video communication for business uses and recreational uses, the concern for maintaining quality communication with good eye contact while utilizing video conferences or video communications has come to light.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by taking the position of a corresponding video camera into consideration when placing a video window of a video communication application. A common practice for conventional video communication applications is to place a video window at a predefined position that may not be changed or at a central location, with no knowledge of the video camera position. As a result, the users utilizing the video conference may not communicate with good eye contact, which may reduce the quality of the communication. The present invention increases the probability that good eye contact will be maintained between users during a video conference by taking notice of the video camera position and positioning a corresponding video window at a position closest to the corresponding video camera. As a result, an atmosphere is created where the user may feel as if they are in a real meeting with another user since eye contact is maintained through the position of the video.

Furthermore, the present invention differs from previous approaches by rebalancing an audio speaker setting dependent on the position of a corresponding video camera. A common practice for conventional video communication applications is to simply output audio from the communicating user equally between each audio speaker, with no knowledge or consideration of a video camera position or an audio speaker position. The present invention may increase the quality of a communication experience for a video conference by making notice of the video camera position and each audio speaker position and further rebalancing an audio speaker setting, so that audio from the audio from the communicating user is only outputted from one or more speakers in the direction or proximity of the video camera. Through the use of the present invention, the video conferencing experience may further be increased since the user position is emphasized through positioned audio output.

Figure 1:
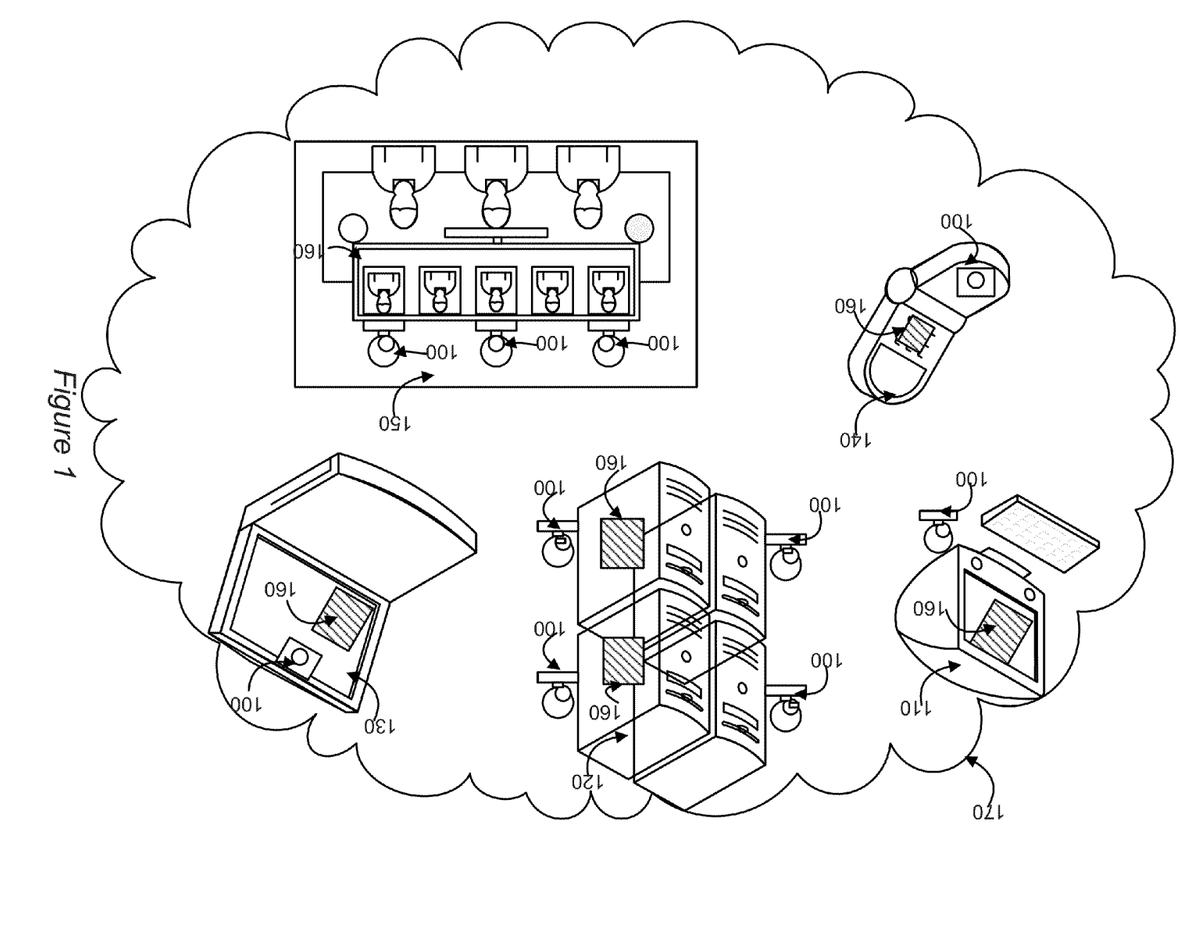
FIG. 1 illustrates different apparatuses and devices which may use the invention independently or in conjunction with one another according to an embodiment of the invention.

FIG. 1 illustrates different apparatuses and devices, a desktop computer 110, a server 120, a portable computer or multi-media device 130, a cellular phone or device 140, and a video conferencing center 150, which may have one or more user and one or more video cameras, which may use the invention independently or in conjunction with one another according to an embodiment of the invention.

As shown in FIG. 1, one or more video cameras 100 may be attached to one or more the apparatuses or devices, such as a desktop computer 110, a server 120, a portable computer or multi-media device 130, a cellular phone or device 140, and a video conferencing center 150 with multiple users and multiple video cameras 100. Furthermore, as illustrated in FIG. 1, one or more of the apparatuses or devices may have a video communication application 160 which may be stored locally or remotely to have a video conference with one or more additional apparatuses or devices utilizing a network 170. Different apparatuses or devices may have additional components attached and have additional applications or functions stored locally or remotely in addition to and/or in lieu of those depicted in FIG. 1.

A server 120 may be utilized to host a video conference with multiple users utilizing a network 170. The server 120 may establish a connection between each device or apparatus, provide a video communication application 160 to each device or apparatus, and provide a video camera position data and an audio speaker position data. One user may utilize a video camera attached to a desktop 110, another user may utilize the integrated video camera on their portable computer or multi-media device 130, another user may be traveling and utilize a video camera attached to their cellular phone 140, and multiple users may be in a video conferencing center 150. The video communication application on the server 120 may then position a video window for each user and rebalance an audio speaker setting for each user to create a video conference environment where good eye contact is maintained for each user and the direction of the user is emphasized through the rebalanced audio speaker setting. Different apparatuses or devices may use the invention independently or in conjunction with one another in addition to and/or in lieu of those depicted in FIG. 1.

Figure 2:
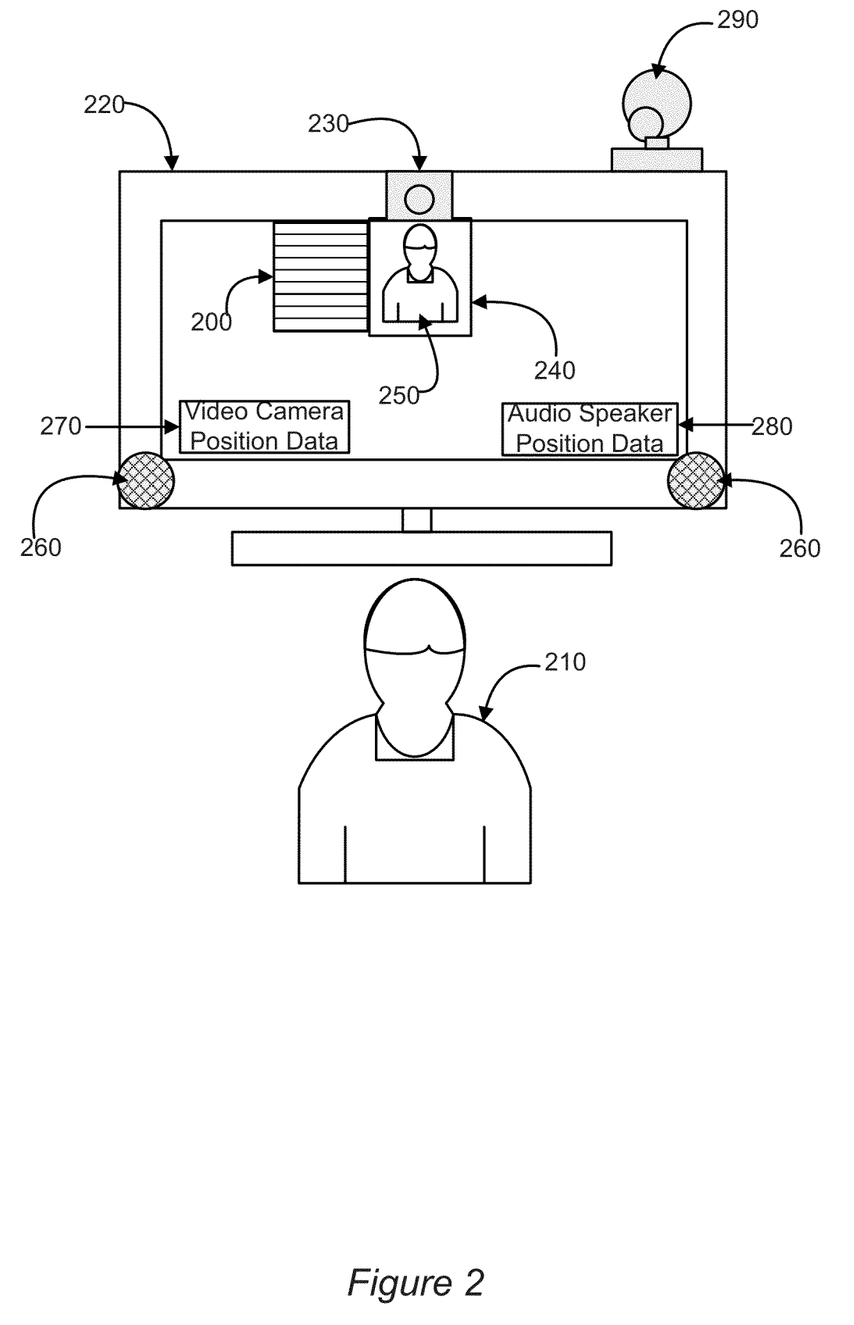
FIG. 2 illustrates a user utilizing an integrated video camera and one or more devices or applications for automatically or manually providing video camera position data and audio speaker position data to position one or more video windows and rebalance an audio speaker setting according to an embodiment of the invention.

FIG. 2 illustrates a user utilizing an integrated video camera and one or more devices or applications for automatically or manually providing video camera position data and audio speaker position data to position one or more video windows and rebalance an audio speaker setting according to an embodiment of the invention. As shown in FIG. 2, the user 210 is using video camera-1 230, that is integrated into the video display device 220, video camera-2 290, that is attachable to the video display device 220, and one or more audio speakers 260 to have a video conference with another user 250 shown through a video window 240 of a video communication application 200.

In one embodiment, where video camera-1 230 is used, the manufacturer of the video display device 220 may automatically provide a video camera position data 270 for video camera-1 230, since video camera-1 230 is integrated. Additionally, the manufacturer of the integrated video camera 230 may automatically provide a manufacturer defined video camera position. Furthermore, a video communication application 200 may automatically provide a default video camera position as top center because video cameras 230 are often mounted in the top center for video conferences.

In addition, the manufacturer of the video display device 220 may automatically provide a audio speaker position data 280 for each audio speaker 260, since each audio speaker 260 is integrated. Furthermore, the manufacturer of the integrated audio speaker 260 may automatically provide a manufacturer defined audio speaker position. Additionally, the video communication application 200 may automatically provide a default audio speaker position as bottom left and bottom right because integrated audio speakers are often mounted in the bottom left and bottom right of video display devices.

Furthermore, where integrated video camera-1 230 is utilized, the video communication application 200 may then utilize the video camera position data 270 to position the video window 240 of another user 250 in a position closest to the integrated video camera 230, top-center in the present embodiment. The video communication application 200 may then utilize the video camera position data 270 and the audio speaker position data 280 to rebalance an audio speaker setting. Since the video window 240 is positioned in the top center, the audio speaker setting may be rebalanced to evenly distribute audio from each audio speaker 260 evenly.

In another embodiment, where the user 210 wishes to use attachable video camera-2 290, the video communication application 200 may determine the position of the attachable video camera-2 290 and utilize the video camera position data 270 of attachable video camera-2 290 to re-position the video window 240 of another user 250 to the top-right. The video communication application 200 may then utilize the video camera position data 270 and the audio speaker position data 280 to rebalance an audio speaker setting. Where the video window is in a top-right position, the video communication application 200 may rebalance the audio speaker setting to output audio from another user 250 from only the right audio speaker 260. As a result, a video conference environment is created where eye contact is maintained through the video window 240 being strategically placed at a position closest to the video camera-2 290 and a user's position is emphasized through audio speaker 260 rebalancing so that audio is only outputted from the direction of the video window 210. Additional devices and/or applications may automatically or manually be used to provide video camera position data and/or audio speaker position data to create a video conference experience where eye contact is maintained and user position is emphasized in addition to and/or in lieu of those depicted in FIG. 2.

Figure 3:
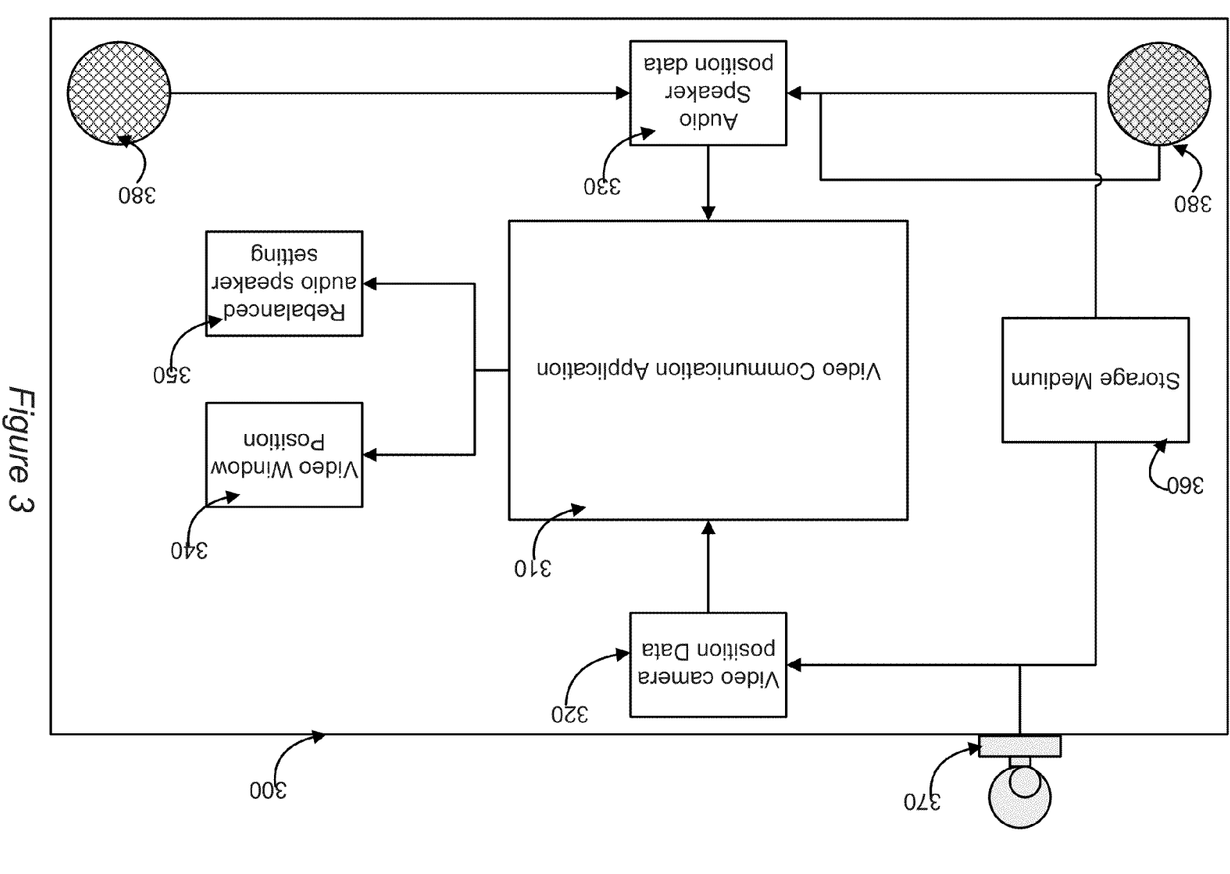
FIG. 3 illustrates a system where a video communication application utilizes a video camera position data and an audio speaker position to determine one or more video window positions and a rebalanced audio speaker setting according to an embodiment of the invention.

FIG. 3 illustrates a system where a video communication application utilizes a video camera position data and an audio speaker position to determine one or more video window positions and a rebalanced audio speaker setting according to an embodiment of the invention. As illustrated in FIG. 3, a video application 310 may receive a video camera position data 320 and an audio speaker position data 330 from a video camera 370, one or more audio speakers 380, and/or a storage medium 360. The video communication application 310 may then utilize the video camera position data 320 to create one or more video windows 340 and position each video window 340. In addition, the video communication application 310 may utilize the video camera position data 320 and the audio speaker position data 330 to rebalance the audio speaker setting 350. The video communication application 310 may receive additional data and information and perform additional functions and modify additional settings in addition to and/or in lieu of those depicted in FIG. 3.

Figure 4:
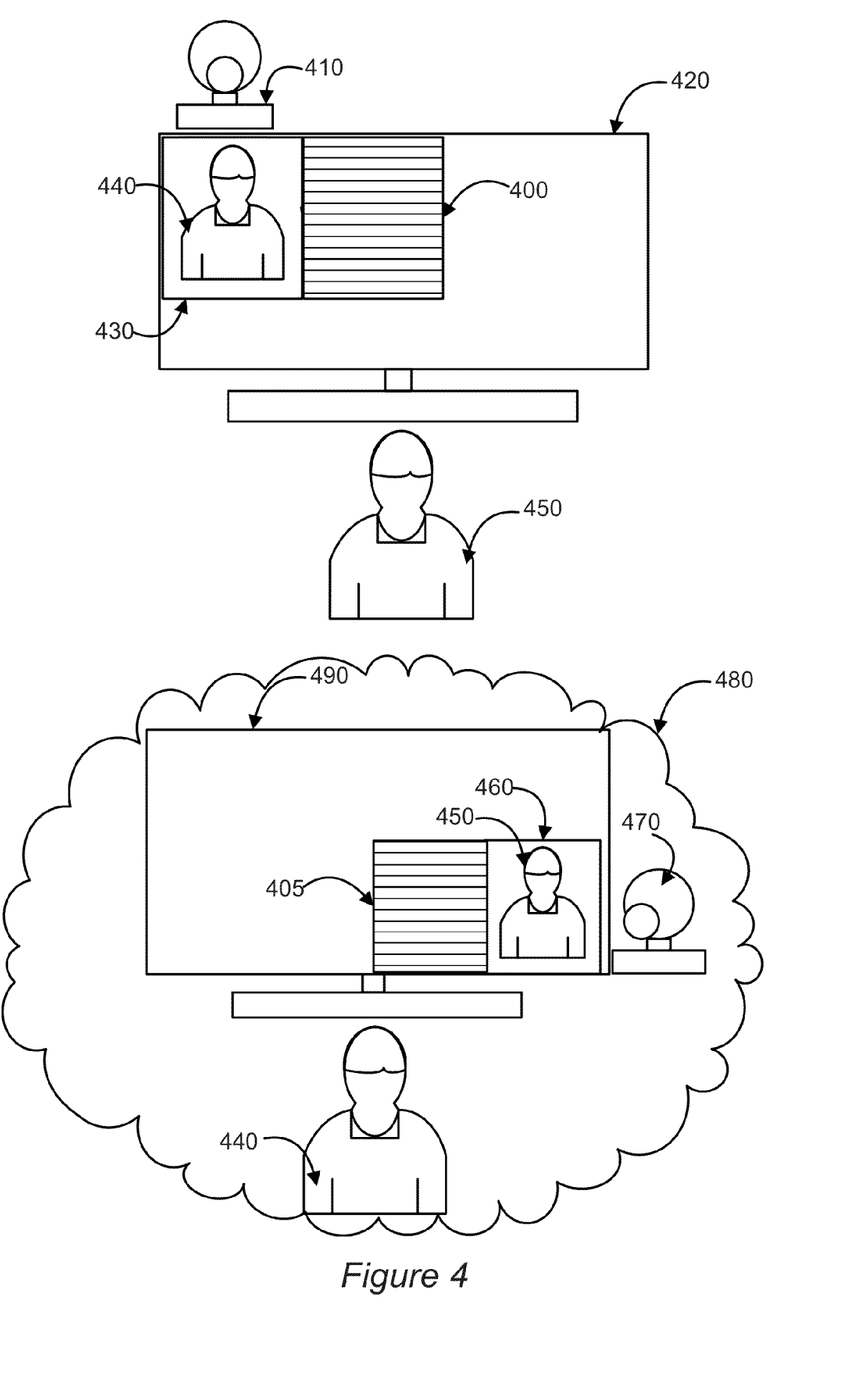
FIG. 4 illustrates two users utilizing an attachable video camera and a detachable video camera for maintaining good eye contact during a video conferencing according to an embodiment of the invention.

FIG. 4 illustrates two users utilizing an attachable video camera and a detachable video camera for maintaining good eye contact during a video conferencing according to an embodiment of the invention. The illustration shows video camera-1 410, video display device-1 420, video window-1 430, user-1 450, video camera application-1 400, user-2 440, video camera-2 470, video display device-2 490, video window-2 460, video camera application-2 405, and a network 480. The video conference of FIG. 4 may support other devices or components in addition to and/or in lieu of those depicted in FIG. 4.

As illustrated in FIG. 4, user-1 450 and user-2 440 may have a video conference through a network 480 using one or more video communication applications 400, 405. User-1 450 may utilize video camera-1 410 attached to video display device-1 420. User-2 440 may utilize a video camera-2 470 detached from the video display device-2 490. A network is a system of computers interconnected by telephone wires or other means in order to share information. The present invention may utilize a network comprising a wide area network. Additionally, the present invention may utilize a local area network. As illustrated in FIG. 4, the network may be used by one or more users to share and transfer information, such as digital images and/or video streams for a video conference.

A video display device is a device that may output a still image or a moving image. The video display device may be a monitor, a touch screen, a television, a projector, or a holographic video display. As illustrated in FIG. 4, the video display device may be utilized by two users to show a digital image or video stream of other users for the purpose of a video conference. Furthermore, as illustrated in FIG. 4, user-1 450 may view user-2 440 in video window-1 430 of video communication application-1 400 and user-2 440 may view user-1 450 in video window-2 460 of video communication application-2 405. In the present embodiment, video camera-1 410 may capture an image or video stream of user-1 450 and video communication application-1 400 may transfer the image or video stream over a network 480 to video communication application-2 405 so that it may be displayed to user-2 440 through video display device-2 490.

As shown in FIG. 4, video communication application-2 405 of user-2 440 may utilize the video camera position data of video camera-2 470 and position video window-2 460 in a position closest to video camera-2 470. Because the video window-2 460 is placed in a position closest to video camera-2 470, user-2 440 will subsequently be looking at video camera-2 470 when viewing the image or video stream of user-1 450 since video camera-2 470 will be in the line of sight of user-2 440 when viewing video window-2 460. In addition, video camera-2 470 may capture an image or video stream of user-2 440 and transfer the image or video stream over a network 480 to video communication application-1 400. Video communication application-1 400 may subsequently display the image or video stream of user-2 440 in a display device-1 420 and position video window-1 430 at a position closest to video camera-1 410 so that the image or video stream of user-2 is at a position closest to video camera-1 410. As a result, both user-1 450 and user-2 440 will be maintaining good eye contact with one another during the video conference.

Figure 5:
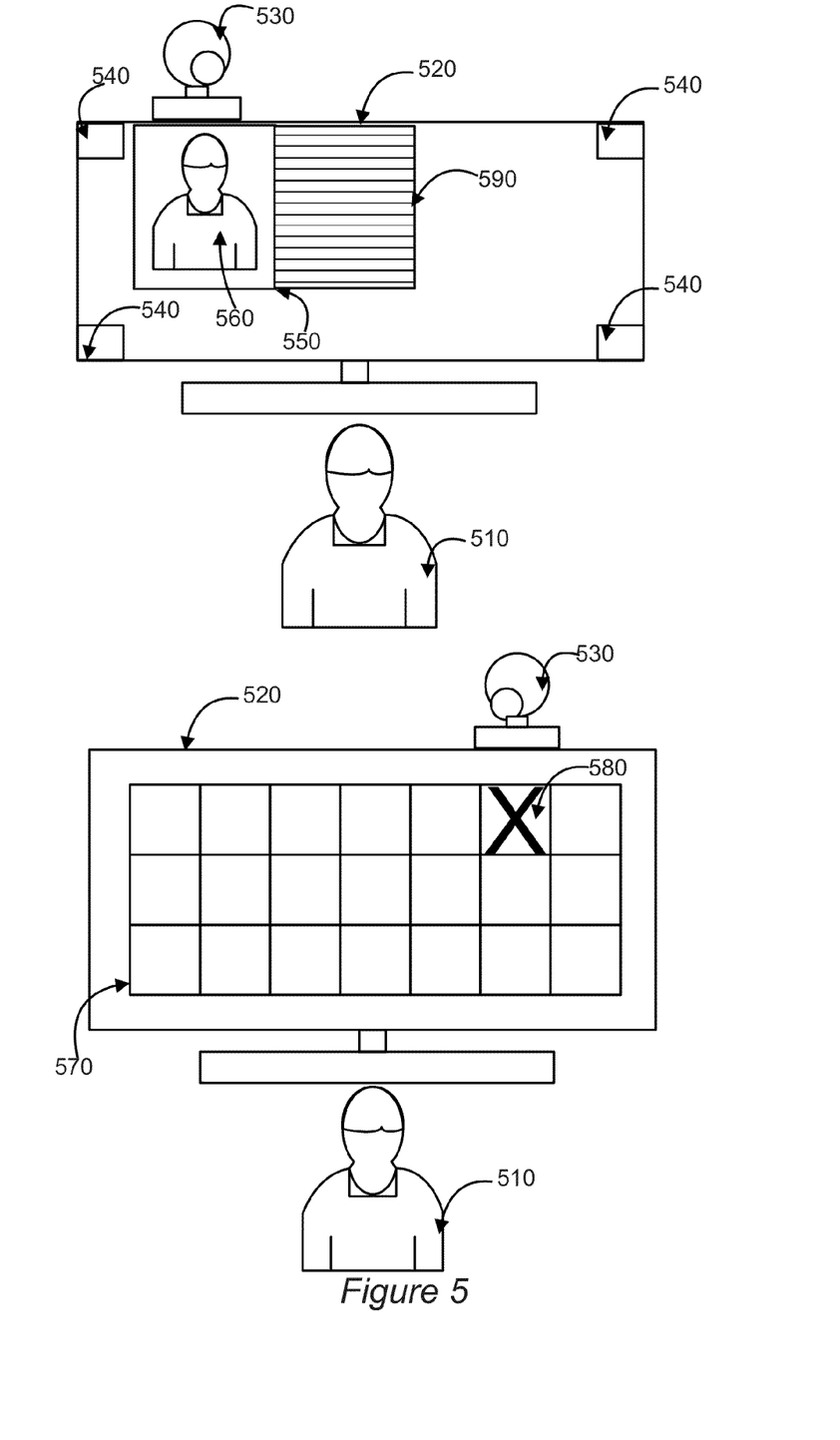
FIG. 5 illustrates a user utilizing sensors to determine a video camera position and a user defining the video camera position according to different embodiments of the invention.

FIG. 5 illustrates a user utilizing sensors 540 to determine a video camera 530 position and a user 510 defining the video camera 530 position according to different embodiments of the invention. As illustrated in the embodiment in FIG. 5, a user 510 may utilize sensors 540 on a video display device 520 to detect and determine the position of a video camera 530 in order for a video communication application 590 to position a video window 550 showing an image or video stream of another user 560. The video display device 520 may utilize sensors which may be integrated or detachable from the video display device 520. As noted above in FIG. 3, one or more sensors 540 may emit a signal and one or more video cameras 530 may emit a response signal. One or more sensors 540 may then read the response signal for each video camera 530 and automatically determine the position of each video camera 530. Additionally, one or more video cameras 530 may periodically emit signals automatically or upon user 510 defined instruction. One or more sensors 540 may then listen for the signal and may automatically determine the position of each video camera 530.

In another embodiment, as illustrated in FIG. 5, a user 510 may define the video camera position 580 of a video camera 530 in reference to the video display device 520 utilizing a map of the display 570. As noted in FIG. 3, the system or the video communication application 590 may generate a map 570 of various locations where the video camera 530 may be located and prompt the user 510 to click on the area where the video camera 530 is positioned. Additionally, the video display device 520 may be a touch screen video display device and the user 510 may touch an area on the screen 570 closest to the location where the video camera 530 is positioned. The position of a video camera 530 may be determined using additional devices or methods in addition to and/or in lieu of those depicted in FIG. 5.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 6:
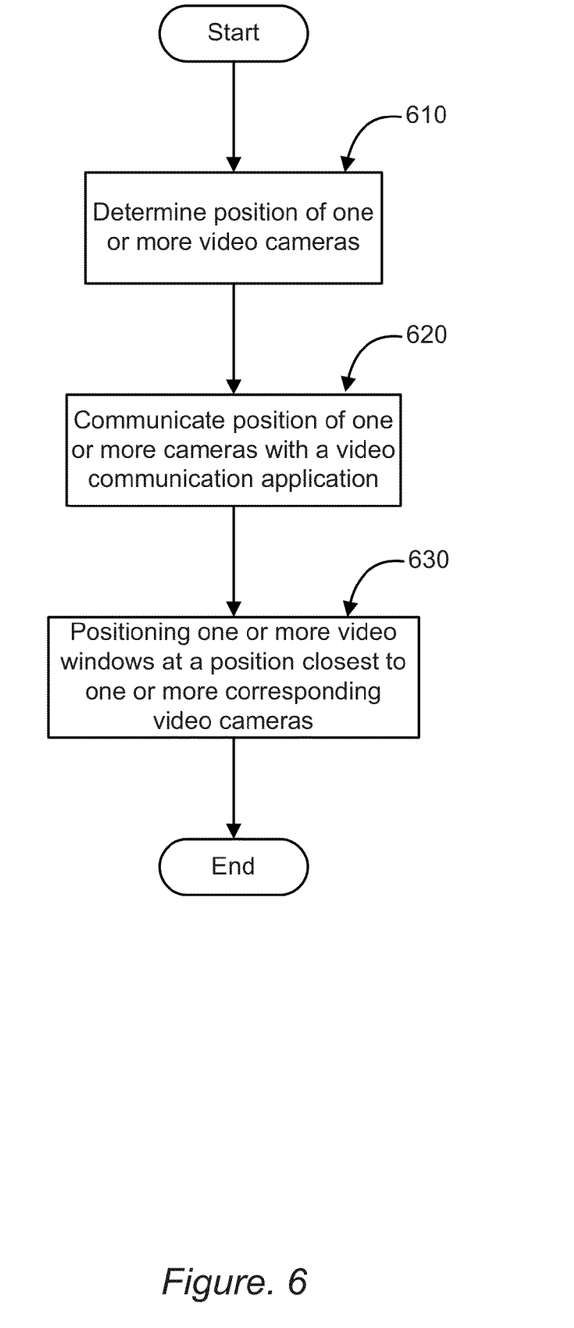
FIG. 6 is a flow chart illustrating a method for positioning one or more video windows at a position closest to one or more video cameras in response to the position of one or more video cameras according to an embodiment of the invention.

FIG. 6 is a flow chart illustrating a method for positioning one or more video windows at a position closest to one or more video cameras in response to the position of one or more video cameras according to an embodiment of the invention. The method of FIG. 6 utilizes one or more video cameras, one or more video camera positions, one or more video camera position data, one or more video communication applications, and one or more video window positions. The method of FIG. 6 may be performed by different devices or components in addition to and/or in lieu of those depicted in FIG. 1. The method of FIG. 6 may be performed by one or more systems or one or more users. As illustrated in FIG. 6, a system may be used to manually or automatically determine the position of one or more video cameras 610. In addition, a user may determine the position of one or more video cameras.

A video camera is a device that may capture an image or a video stream. One or more video cameras may be attached or detached from a system or display unit. As noted above, one or more video cameras may be integrated into the system. Additionally, one or more video cameras may be attached or mounted onto a system or a video display device of the system in different positions. One or more video cameras may be attached or connected to additional components or devices in addition to and/or in lieu of those depicted in FIG. 1. Additionally, one or more video cameras may be included in a wide range of devices and image or video stream resolutions. One or more video cameras may be a high definition video camera used for video conferencing, supporting high resolution images and video streams. Additionally, one or more video cameras may be a webcam supporting a wide range of image video stream resolution. Furthermore, one or more video cameras may be an integrated camera on a telephone or cellular phone supporting a wide range of resolution images and video streams. One or more video cameras may be included in additional devices or components in addition to and/or in lieu of those depicted in FIG. 1.

The video camera may include an audio speaker for audio output. Additionally, the video camera may include one or more microphones for audio input. The image or video stream captured by one or more video cameras may be used by a system or a video communication application. The image or video stream may be immediately used or transferred by a system or a video communication application for real time use, such as video conferencing. Additionally, the image or video stream may be transferred or stored for later use or playback by the system or video communication application.

A video camera position is the location of a corresponding video camera, with a video display device of the system as a reference point. A video camera may be integrated at the top of the video display device and the video camera position may be top-center. Additionally, a video camera may be detachable and placed on the table to the right of video display device and the video camera position may be bottom-right. One or more video cameras may be placed in additional positions in addition to and/or in lieu of those depicted in FIGS. 2, 4, and 5.

One or more video camera positions may be used to create one or more video camera position data. One or more video camera position data may then be communicated to a video communication application to position one or more video windows. A video camera position data may be digital data that is accessed by a system or by a video communication application. A video camera position data may indicate the position of one or more video cameras relative to a video display device and the size of one or more video windows desired for the video communication application. A single file may be used to store one or more video camera position data of one or more video cameras. Additionally, a configuration file may be used to store the video camera position data of one or more video cameras and additional data other than the video camera position data. Furthermore, one or more files may be used to store the video camera position data of each video camera.

As noted above, the video camera position data may include information regarding the location of one or more video cameras. The video camera position data may indicate the video camera position with text stating the position of the video camera as top left, top center, right center, left bottom, etc. Additionally, the video position data may be an x and y coordinate of where the video camera is located on a map of the display device. The video camera position data may indicate the position of one or more cameras in other ways in addition to and/or in lieu of those depicted in FIG. 5. In addition, as noted above, the video camera position data may indicate the size of each video window desired. The video camera position data may indicate that the video window size desired be x window length by y window height. Additionally, the video camera position data may indicate that the video window size desired be variable, dependent on the space available.

The video camera position data may be stored locally or remotely by the system or the video communication application utilizing various storing devices or methods. The video camera position data may be stored locally by the system in a storage medium, such as a hard drive, which may include volatile or non-volatile memory. Additionally, the storage medium may be a compact disc, digital versatile disc, or an external hard drive. Furthermore, the video camera position data may be stored on a detachable storage medium, such as an external hard drive or a compact disc. In addition, the video camera position data may be stored remotely on another system or on a server.

The system or user may then communicate the position of one or more video cameras with a video communication application 620. The video camera position data may be used by a video communication application to position one or more video windows. The system may digitally transfer data of the video camera position to the video communication application. Additionally, the user may manually input the data of the video camera position into the video communication application.

The video communication application is an application used for video conferencing and communication. The video communication application may be a video conferencing application utilized for business meetings. Additionally, the video communication application may be an instant messaging application for business use or personal use. The video communication application may be stored locally on the system or remotely on another system or server.

The video communication application may support many communication functions such as video chat, audio chat, and file transfers. The video communication application may include one or more video windows and one or more video camera position data. Additionally, the video communication may include one or more video windows, one or more video camera position data, one or more audio speakers, and one or more audio speaker settings. The video communication application may include and support other functions in addition to and/or in lieu of those depicted above.

The video communication application may read one or more video camera position data and position one or more video windows based on one or more corresponding video camera position data. As noted above, the video window may be placed in various positions on the video display device and is placed at a position closest to the video camera, optimal for maintaining good eye contact between one or more users that are communicating with one another. The system or the video communication application may read a video camera position data and utilize an x and y grid chart or pixel map to determine the placement of one or more video cameras. Additionally, the system or video communication application may utilize a map of the video display device to determine one or more video camera positions.

As illustrated in FIG. 6, the video communication application may then position one or more video windows of the video communication application at a position closest to one or more corresponding video cameras 630. The video camera may be mounted to a video display device and a video window of the video communication application may be positioned at a position where the video camera is mounted. Additionally, the video camera may be detached from the video display device and placed at a distance away from the video display device. The video window of the video communication application may then be placed at a position closest to the detached video camera. One or more video cameras may be placed in additional locations and one or more video windows may be positioned at a position closest to one or more corresponding video cameras in addition to and/or in lieu of those depicted in FIGS. 2, 4, and 5.

Furthermore, in positioning one or more video windows, the video communication application may determine if a video window position is available according to the video position data. The video communication application or the computer system may scan the area and determine whether any other video window or application is currently positioned in that area. In one embodiment, the video communication application may read the video camera position data as top-left. The video camera application may then scan the top-left portion of the video display device and determine whether or not that position is available. If no application or video window is currently placed in the specified area, the position is available and the video window may be placed in the area.

If the position is not available, the video communication application may place the video window at a next closest available position. A next closest available position is a position that is the shortest distance away from the position indicated by the video camera position data. If the area is currently occupied by another application or video window, the video communication application may reposition the existing video window or existing application occupying the indicated position so that the video window may be positioned according to the position data. Additional methods may be used in determining whether a video window position is available and additional actions may be taken if the video window position is not available in addition to and/or in lieu of those depicted above.

Furthermore, the video communication application may determine whether the size of the video window will fit in the available area by comparing the size of the desired video window from the video camera position data and size of the available space. If the video window is too large, the video communication application may move an existing video window or application to make sufficient room for the video window. Additionally, the system or video communication may resize the video window so that it may fit in the available space. Additional methods may be used in positioning a video window if the size of the video window desired is greater than the available space in addition to and/or in lieu of those depicted above.

Figure 7:
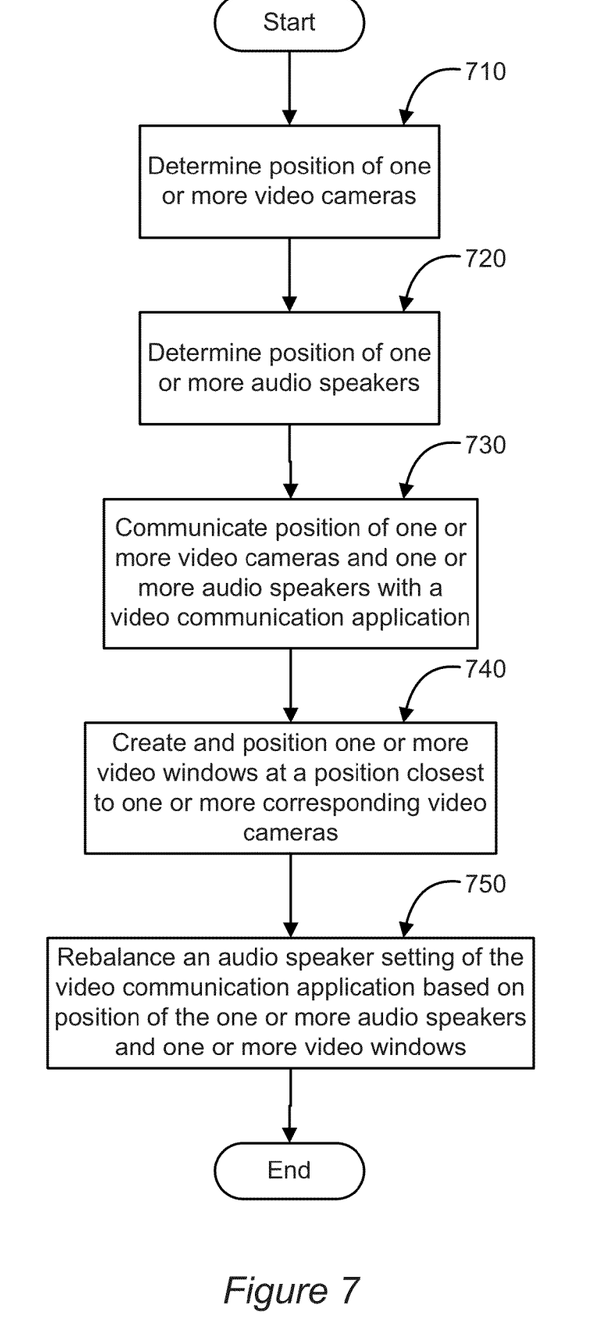
FIG. 7 is a flow chart illustrating a method for positioning one or more video windows at a position closest to one or more video cameras and rebalancing an audio speaker setting based on the position of the one or more video window positions according to an embodiment of the invention.

FIG. 7 is a flow chart illustrating a method for positioning one or more video windows at a position closest to one or more video cameras and rebalancing an audio speaker setting based on the position of the one or more video window positions according to an embodiment of the invention. The method of FIG. 7 utilizes one or more video cameras, one or more video camera positions, one or more video camera position data, one or more audio speakers, one or more audio speaker positions, one or more audio speaker position data, one or more video communication applications, one or more video window positions, and a rebalanced audio speaker setting. The method of FIG. 7 may be performed by different devices or components in addition to and/or in lieu of those depicted in FIG. 1.

A system or user may initially determine the position of one or more video cameras, with a video display unit as a reference point 710. The system or user may then determine the position of one or more audio speakers 720. An audio speaker is a device that emits sound waves that may be audible to the human ear. The audio speaker may be connected to the system and may be placed in different locations around the system. Additionally, the audio speaker may be integrated into the system. One or more audio speaker may be placed in additional locations in addition to and/or in lieu of those depicted in FIGS. 2 and 3.

The system or user may then communicate the position of one or more video cameras and one or more audio speakers with a video communication application 730. As noted above, a video camera position is the position of one or more video cameras in reference to a video display device. An audio speaker position is the location of one or more audio speakers in reference to a video display device and may be stored in one or more audio speaker position data. An audio speaker position data includes information of the position of one or more audio speakers and may be stored locally on the system or remotely on another system or server. The audio position data may be read and accessed by the video communication application.

As illustrated in FIG. 7, the video communication application may then create and position one or more video windows at a position closest to one or more corresponding video cameras 740. The video communication application may then rebalance an audio speaker setting based on the position of one or more video positions and the position of one or more audio speakers 750. An audio speaker setting controls the outputting of sound from one or more audio speakers. The settings may include modifiable treble and bass values for the audio output. Additionally, the settings may further include options to adjust the amount of output for each audio speaker. The audio speaker setting may control and allow modifications of additional values or settings that may modify the audio outputted from one or more audio speakers in addition to and/or in lieu of those depicted above.

An audio speaker setting may be rebalanced by modifying audio values, such as the amount of treble, bass, and output for each audio speaker. If the video window position data indicates that the video window position is on the top left and there are two audio speakers, one placed to the left of the video display device and one placed to the right of the video display device, the video communication application may rebalance the audio speaker setting to only allow audio output from the left speaker. Additionally, the video communication application may position a video window in the top center of the screen and the video window application may rebalance the audio speaker setting to evenly distribute audio between each speaker. The audio speaker setting may be rebalanced by additional audio speaker arrangements and by utilizing additional audio speaker settings in additional locations in addition to and/or in lieu of those depicted above.

Figure 8:
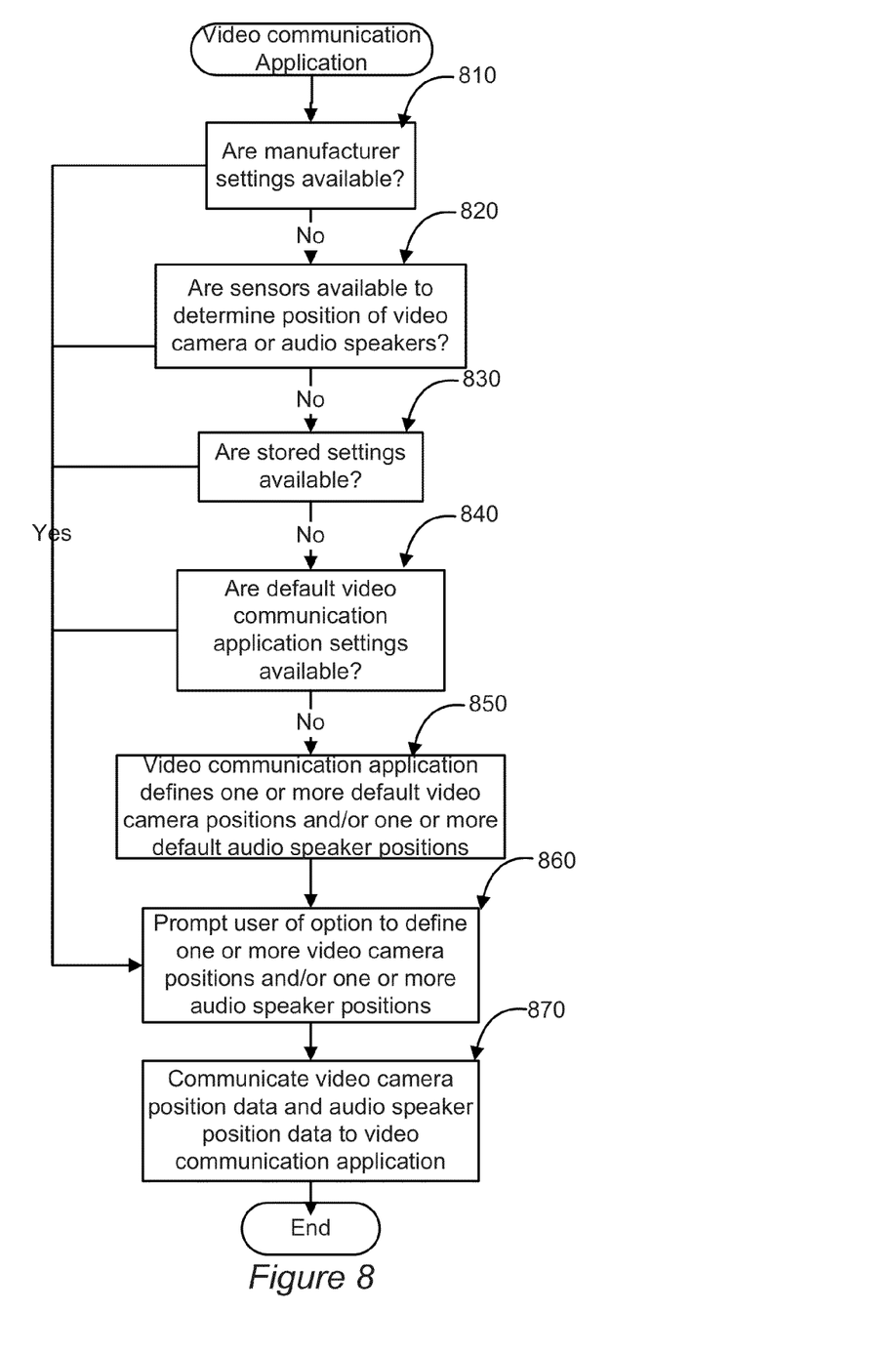
FIG. 8 is a flow chart illustrating a method for determining a position of one or more video cameras and communicating the video camera position data to a video communication application according to an embodiment of the invention.

FIG. 8 is a flow chart illustrating a method for determining a position of one or more video cameras and communicating the video camera position data to a video communication application according to an embodiment of the invention. The method of FIG. 8 may utilize a video communication application, a manufacturer setting, sensors, existing stored user settings, default video communication application settings, and definable user settings. A sensor is a device that may detect the number of video cameras and/or audio speakers and the location of each video camera and/or each audio speaker by emitting and receive a signal. The signal emitted and/or received by the sensor may be a light wave, a radio wave, sound wave, band, and/or frequency. The method of FIG. 8 may be performed by different data, devices, or components in addition to and/or in lieu of those depicted in FIG. 5.

As illustrated in FIG. 8, a video communication application may initially determine if manufacturer settings are available for indicating the position of one or more video cameras 810. A video camera position data may be defined and created by the manufacturer of the video camera, system, or video communication application. The manufacturer defined video camera position data may identify the position of an integrated video camera or may include a location for placement of the video camera. In addition, the audio speaker position may also be predefined by the manufacturer of the system or manufacturer of the audio speakers. If manufacturer settings are available, a user may then be prompted and given the option of overriding the manufacturer settings by defining one or more video camera position data and/or one or more audio speaker position data 860. Each video camera position data and each audio speaker position data may then be transferred to the system or video communication application 870.

If no manufacturer settings are available, the video communication application may further determine if one or more sensor is available to determine the position of one or more video cameras and one or more audio speakers 820. One or more sensor may emit a signal and one or more video cameras or one or more audio speakers may emit a response signal. One or more sensors may then read the response signal for each video camera and each audio speaker and automatically determine the position of each video camera and each audio speaker. Additionally, one or more video cameras and one or more audio speakers may periodically emit signals automatically or upon user defined instruction. One or more sensor may then listen for the signal and may automatically determine the position of each video camera and each audio speaker. A user may then be prompted and given the option of overriding the settings from the sensor by defining one or more video camera position data and/or one or more audio speaker position data 860. Each video camera position data and each audio speaker position data may then be transferred to the system or video communication application 870.

If no sensors are available to determine the number and position of one or more video cameras and one or more audio speakers, the video communication may further determine if stored settings are available 830. Stored settings may be previously recorded user defined video camera position data and/or audio speaker position data. Additionally, stored settings may be previously recorded video camera position data and audio speaker position data that may have been defined by a manufacturer or through the use of sensors. Stored settings may be defined using additional means or additional devices in addition to and/or in lieu of those depicted in FIG. 8. A user may then be prompted and given the option of overriding the stored settings by defining one or more video camera position data and/or one or more audio speaker position data 860. Each video camera position data and each audio speaker position data may then be transferred to the system or video communication application 870.

If no stored settings are available, the video communication may further determine if default video communication application settings are available 840. A default video camera position data indicates a default assumed position of one or more video cameras and may be defined by the video communication application. The default video camera position data may indicate a default position of top center. The video communication application may then utilize the default video camera position data to position a video window at a top center position as a default. If no default video communication application settings are available, the video communication application may automatically define one 850. A user may then be prompted and given the option of overriding the default video communication application settings by defining one or more video camera position data and/or one or more audio speaker position data 860. Each video camera position data and each audio speaker position data may then be transferred to the system or video communication application 870.

As noted in step 860, the user may manually define one or more video camera positions and one or more audio speaker positions, create video camera position data for one or more video cameras, and create audio speaker position data for one or more audio speakers. The user may manually enter the position of the video camera to create the video camera position data. Additionally, the system or the video communication application may generate a map of various locations where the video camera may be located and prompt the user to click on the area where the video camera is positioned. Furthermore, the video display device may be a touch screen video display device and the user may touch an area on the screen closest to the location where the video camera is positioned. A user may manually define one or more video camera positions and one or more audio speaker positions, create video camera position data for one or more video cameras, and create audio speaker position data for one or more audio speakers using other methods in addition to and/or in lieu of those depicted in FIG. 8.

Figure 9:
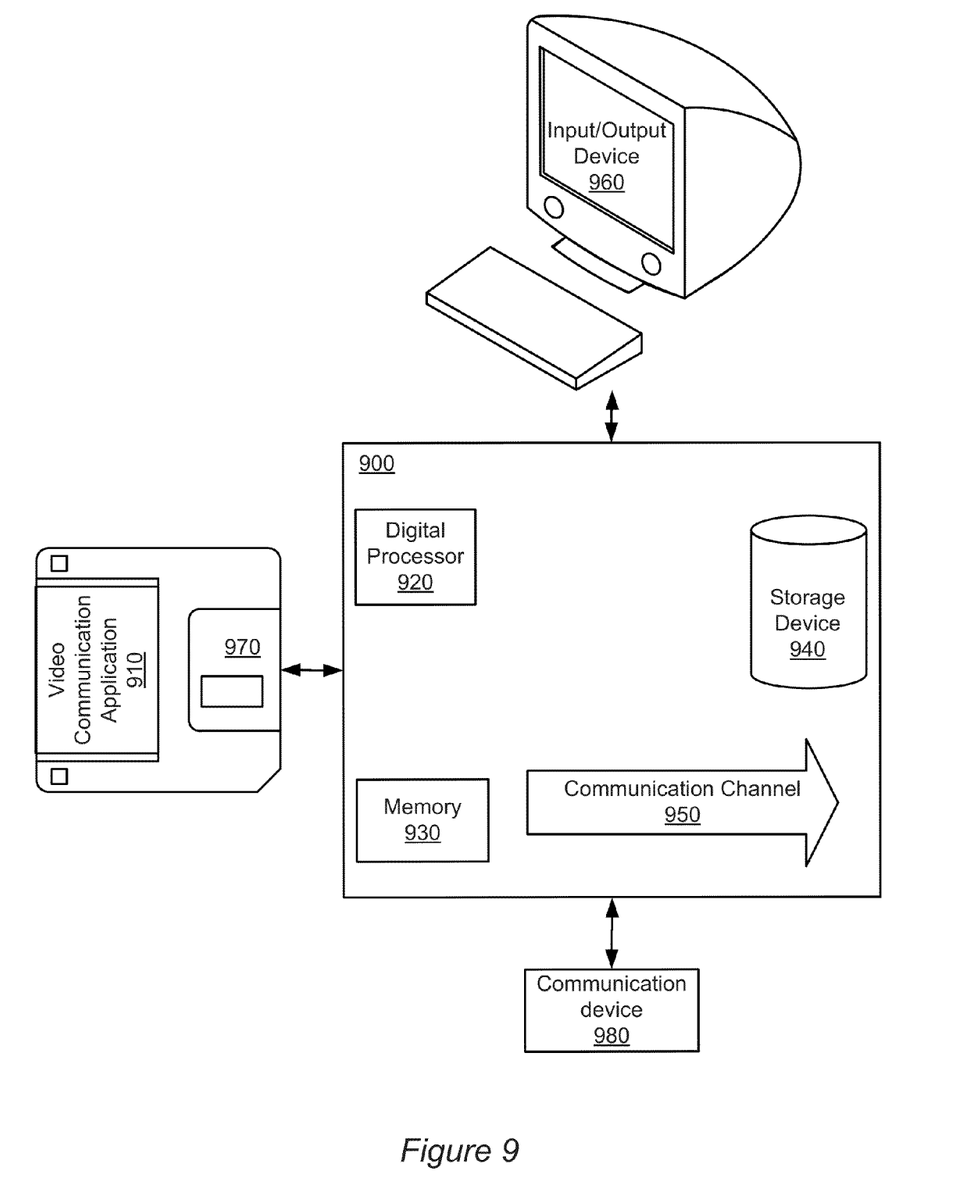
FIG. 9 illustrates a video communication application stored on a removable storage medium being accessed by a system according to an embodiment of the invention.

FIG. 9 illustrates a video communication application stored on a removable storage medium being accessed by a system according to an embodiment of the invention. The video communication application may additionally be stored and accessed from a hard drive, a compact disc, a flash disk, a network drive or any other form of computer readable medium. The video communication application may be stored and accessed from additional devices in addition to and/or in lieu of those depicted in FIG. 9. Additionally, as illustrated in FIG. 9, the system 900 may be connected to an input/output device 960 and a communication device 980. The system 900 may be connected to additional devices and/or components in addition to and/or in lieu of those depicted in FIG. 9.

Furthermore, the system 900 may include a digital processor 920 to process data and/or send receive instructions, memory 930 that may be written to and/or read from, a storage device 940 for temporary or permanent storage, and one or more communication channels 950 for the system's 900 components and devices or components connected to the system 900 to utilize for communication. The system 900 may include additional components in addition to and/or in lieu of those depicted in FIG. 9.

What is claimed is:

1. A method comprising:
    determining a position of one or more video cameras;
    communicating the position of the one or more video cameras with a video communication application;
    controlling a position of one or more video windows in a display device from the position of the one or more video cameras, wherein controlling the position of the one or more video windows comprises:
        positioning the one or more video windows in the display device at a position closest to the one or more video cameras;
        determining whether an initial position of the one or more video windows is available, based on whether or not an area of the initial position is occupied by another window; and
        in response to determining that the initial position is unavailable, select another position for the one or more video windows; and
    rebalancing an audio speaker setting of the video communication application based on the position of the one or more video windows in the display device.

2. The method of claim 1 further comprising determining a position of one or more audio speakers and communicating the position of the one or more audio speakers with the video communication application, wherein rebalancing the audio speaker setting is further based on the position of the one or more audio speakers.

3. The method of claim 2 wherein the position of the one or more video cameras and the position of the one or more audio speakers are determined by at least one setting from the group consisting of manufacturer settings, user settings, and one or more sensors.

4. The method of claim 1, wherein controlling the position of the one or more video windows in the display device further comprises:
    determining whether a size of the one or more video windows will fit into an available area corresponding to the position; and
    in response to determining that the size will not fit into the available area, resizing the one or more video windows.

5. The method of claim 1, wherein determining the position of the one or more video cameras uses one or more sensors that receive one or more signals from the one or more video cameras.

6. A non-transitory computer readable medium storing instructions that upon execution cause a system to:
    determine a position of one or more video cameras;
    control a position of one or more video windows in a display device from the determined position of the one or more video cameras, the one or more video windows moveable in the display device, wherein controlling the position of the one or more video windows in the display device comprises:
        determining whether an initial position of the one or more video windows is available, based on whether or not an area of the initial position is occupied by another window; and
        in response to determining that the initial position is unavailable, select another position for the one or more video windows; and
    adjust an audio speaker setting based on the position of the one or more video windows in the display device, the adjusted audio speaker setting causing adjustment of sound output by one or more audio speakers.

7. The computer readable medium of claim 6, wherein the instructions upon execution cause the system to further determine whether the computer readable medium stores one or more audio speaker position data.

8. The computer readable medium of claim 6 wherein determining the position of the one or more video cameras is based on a pre-existing manufacturer setting.

9. The computer readable medium of claim 8, wherein the instructions upon execution cause the system to further present an option of overwriting the pre-existing manufacturing setting with a setting created from a map of the display device.

10. The computer readable medium of claim 6 wherein determining the position of the one or more video cameras is based on output of one or more sensors that receive one or more signals from the one or more video cameras.

11. The computer readable medium of claim 6, wherein controlling the position of the one or more video windows in the display device comprises:
   determining whether a size of the one or more video windows will fit into an available area corresponding to the position; and
   in response to determining that the size will not fit into the available area, resizing the one or more video windows.

12. A system comprising:
   a display device;
   a video camera;
   at least one processor to:
      determine a position of the video camera with respect to the display device;
      control a position of a video window in the display device based on the determined position of the video camera, the video window moveable in the display device, and wherein controlling the position of the video window in the display device comprises:
         determining whether an initial position of the video window is available, based on whether or not an area of the initial position is occupied by another window; and
         in response to determining that the initial position is unavailable, select another position for the video window; and
      adjust an audio speaker setting based on the position of the video window, wherein the audio speaker setting is to control audio output by at least one audio speaker.

13. The system of claim 12, wherein the at least one processor is configured to further determine a position of the audio speaker, wherein the adjusting of the audio speaker setting is further based on the position of the audio speaker.

14. The system of claim 12, wherein the initial position of the video window is determined to be available if no other window is currently positioned in an area corresponding to the initial position of the video window, and if a size of the video window will fit in an available area corresponding to the initial position of the video window.

15. The system of claim 14, wherein the at least one processor is configured to place the video window at a next closest available position if the initial position is determined to be unavailable, wherein the next closest available position is a next shortest distance away from the position of the video camera.

16. The system claim 12 wherein the at least one processor is configured to determine the position of the video camera based on output of one or more sensors that receive one or more signals from the video camera.

17. The system of claim 12, wherein controlling the position of the video window in the display device comprises:
   determining whether a size of the video window will fit into an available area corresponding to the position; and
   in response to determining that the size will not fit into the available area, resizing the video window.

* * * * *

UNITED STATES PATENT AND TRADEMARK OFFICE
CERTIFICATE OF CORRECTION

PATENT NO. : 8,711,201 B2  
APPLICATION NO. : 13/123191  
DATED : April 29, 2014  
INVENTOR(S) : Mark E Gorzynski

Page 1 of 1

It is certified that error appears in the above-identified patent and that said Letters Patent is hereby corrected as shown below:

In the Claims

In column 14, line 27, in Claim 16, delete "system" and insert -- system of --, therefor.

Signed and Sealed this
Eighteenth Day of August, 2015

Michelle K. Lee
*Director of the United States Patent and Trademark Office*